Dec. 23, 1952 E. M. GREER 2,622,400
AUTOMOBILE HYDRAULIC SYSTEM
Filed Oct. 27, 1948 3 Sheets-Sheet 1

INVENTOR.
EDWARD M. GREER
BY Howard J. Jeandron
ATTORNEY.

Dec. 23, 1952 — E. M. GREER — 2,622,400
AUTOMOBILE HYDRAULIC SYSTEM
Filed Oct. 27, 1948 — 3 Sheets-Sheet 2

INVENTOR
EDWARD M. GREER
BY Howard J. Jeandron
ATTORNEY

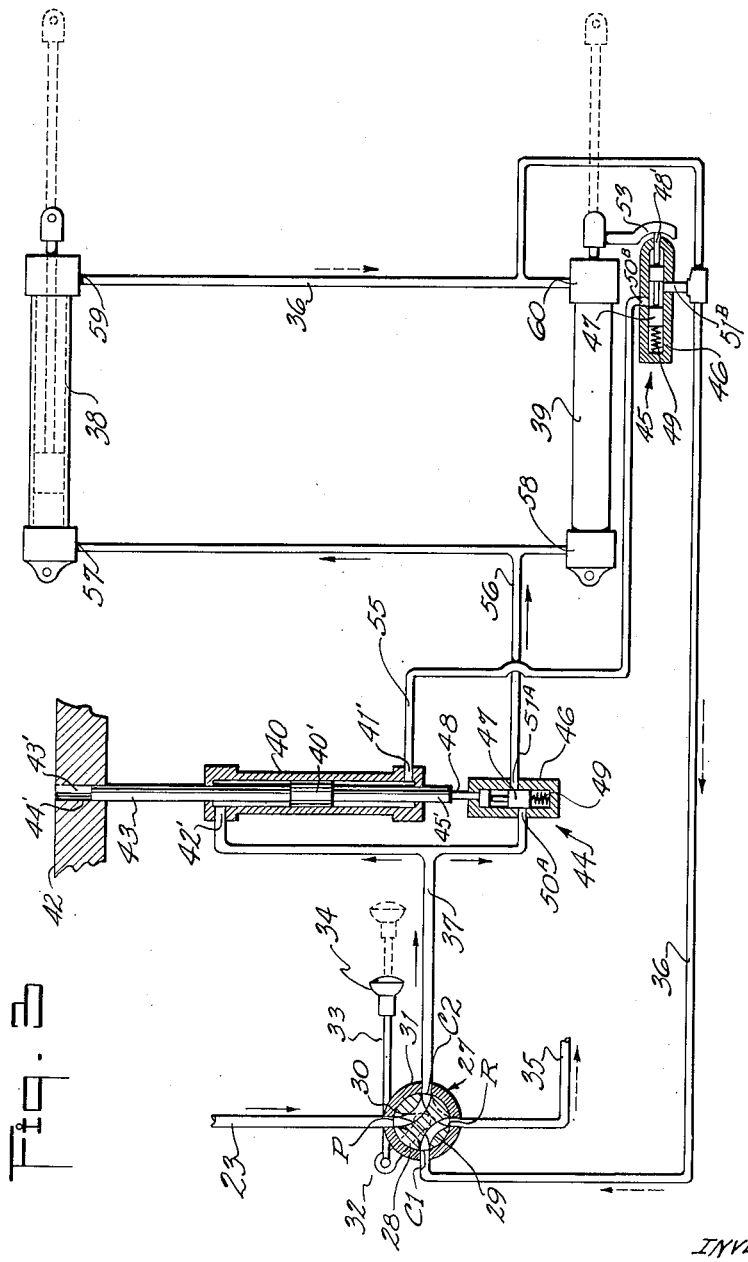

Patented Dec. 23, 1952

2,622,400

UNITED STATES PATENT OFFICE 2,622,400

AUTOMOBILE HYDRAULIC SYSTEM

Edward M. Greer, West Hempstead, N. Y., assignor to Greer Hydraulics, Inc., Brooklyn, N. Y.

Application October 27, 1948, Serial No. 56,775

3 Claims. (Cl. 60—97)

This invention relates to a hydraulic system for automotive vehicles, and is particularly directed to the hydraulic means for actuating various components of the vehicle.

The prior art illustrates various hydraulic devices as included within an automotive vehicle such as hydraulically operated regulators for the vehicle windows and hydraulically operated jacks for lifting said vehicle.

An object of the present invention is to provide a hydraulic system operated from the automotive motor power source and provided with means to store said hydraulic pressure in said system for operating the various components of said hydraulic system.

Another object of this invention is to provide fluid actuated means connected to the hydraulic system of said automotive vehicle, to raise and lower the hood of said automotive vehicle.

Another object of this invention is to provide fluid actuated means connected to the hydraulic system of said automotive vehicle, to raise and lower the folding top of said automotive vehicle.

Another object of this invention is to provide fluid actuated means connected to the hydraulic system of said automotive vehicle, to raise the cover over said luggage compartment.

Another object of this invention is to provide fluid actuated means connected to the hydraulic system of said automotive vehicle to adjust the position of the driver's seat with relation to the driving wheel.

A still further object of this invention is to provide a fluid storage means to store a sufficient quantity of said fluid under pressure from a hydraulic system in said automotive vehicle during the operation of same to provide sufficient fluid power to operate various hydraulic components in said automotive vehicle after the motor in said vehicle has been stopped.

Figure 1:
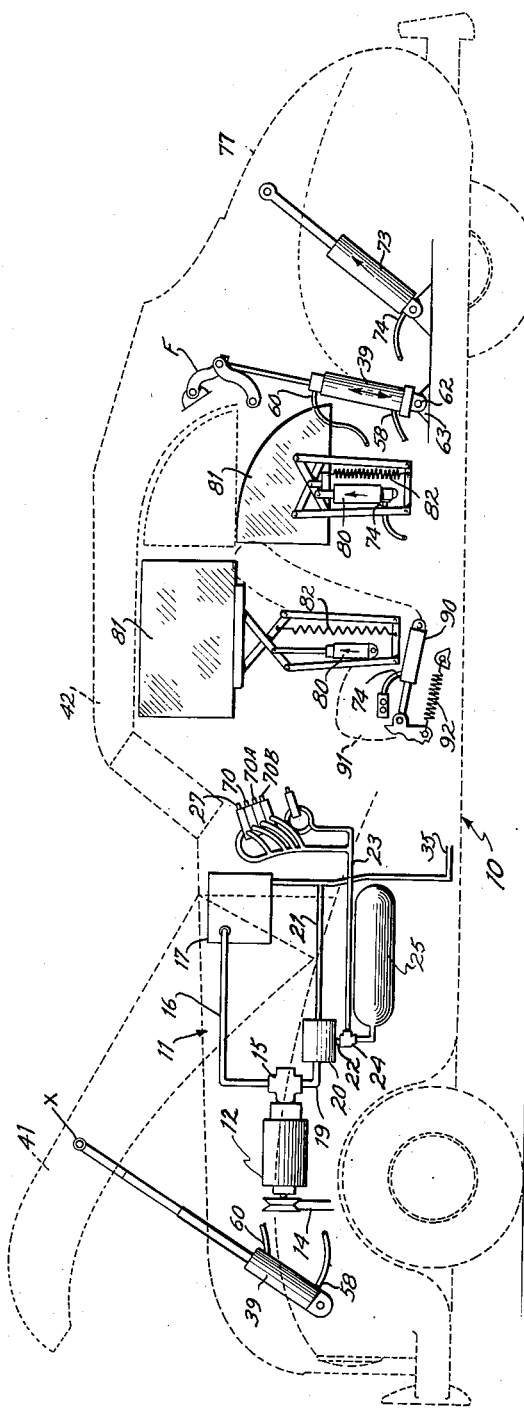
Figure 2:
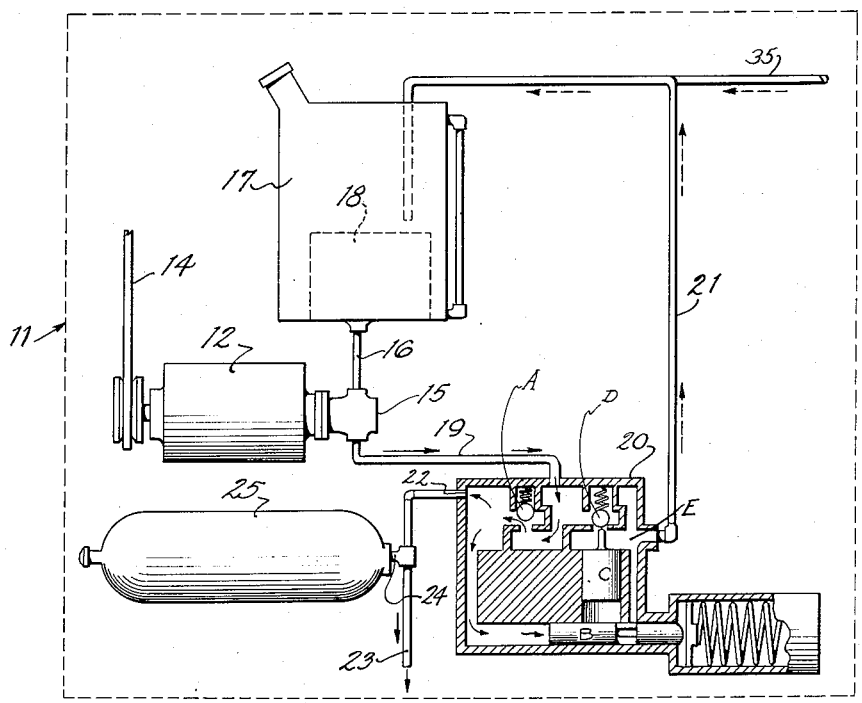
Figures 4, 5:
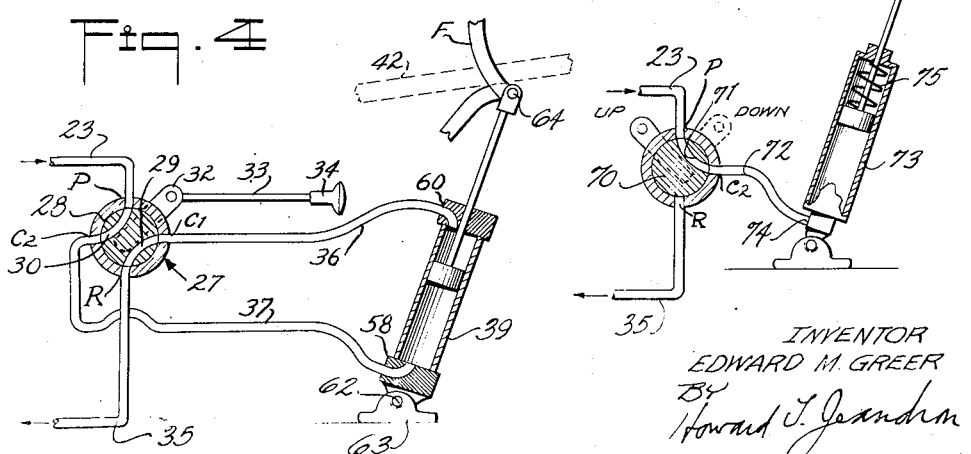

Further objects of this invention will be apparent by reference to the accompanying description and drawings in which:

Fig. 1 illustrates a side elevational view of an automotive vehicle diagrammatically illustrating the hydraulic system and the various hydraulically operated components, Fig. 2 is a diagrammatic illustration of the hydraulic power system, Fig. 3 is a diagrammatic plan view of the hydraulic actuating elements and control valve and locking member for operating either the hood or the top of the automotive vehicle, Fig. 4 is a side elevational view of the top hydraulic actuating cylinder and its control valve, and Fig. 5 is a side elevational view of the trunk actuating hydraulic cylinder and its control valve.

Referring to Fig. 1 there is illustrated a side elevational view of an automotive vehicle 10 in which a hydraulic system and various hydraulic components have been illustrated rather fragmentarily to clearly define the relationship of the system and units to the automotive vehicle. More particularly a hydraulic system 11 is connected to the automotive generator 12 so that with the operation of the automotive generator, the hydraulic system will be charged with fluid under pressure.

Referring to Figs. 1 and 2 the generator 12 may be driven by a belt or chain 14 connected to the motor (not shown). When the generator 12 is operating, a fluid gear pump 15 connected directly to the shaft of the generator 12, will be driven and the pump 15 will draw fluid from a reservoir 17 through a filter 18 and pipe 16, and the pump 15 will force fluid through a pipe 19 to an unloader valve 20. The unloader valve 20 may be of any suitable type to permit flow of fluid under pressure therethrough and when the pressure in said valve reaches a predetermined value, the valve must provide means to unload said fluid through a return line 21 to the reservoir 17. When the fluid under pressure is forced into the unloader valve 20 as shown in Fig. 2, the fluid will flow according to the arrows illustrated, passing through ball valve controlled opening A and through an outlet port 22 and through pipe 23 to be distributed to the hydraulic equipment to be operated. The fluid will also flow through the inlet port 24 of a storage accumulator 25. Assuming the line 23 to be closed, when the accumulator 25 is fully charged the pressure on the fluid in line 23 will produce a back pressure in the unloader valve 20 causing the slide valve B to move to the right (Fig. 2) and the fluid will flow against the piston C to force the latter upwardly to unseat a second ball valve D and thus provide a passageway for the fluid from pipe 19 directly into an exhaust chamber E and out the outlet pipe 21 back to the reservoir 17. When slide valve B has moved to the limit of its stroke the back pressure in unloader valve 20 will cause ball valve A to close. Thus the unloader valve 20 will be cycled in its operation according to the demands of a hydraulic system connected to the pipe 23.

Referring to Fig. 3 there is illustrated diagrammatically a pair of hydraulically operated cylinders 38 and 39 and the hydraulic system and control valves 44 and 45 and lock cylinder 40 that may be utilized for the actuation of the automotive hood 41 or may be similarly installed for the actuation and operation of the folding top 42 of the automotive vehicle. In Fig. 3 the fluid pipe 23 is connected to a rotary selector valve 27 of any standard design illustratively of the type having a central core 28 in which a pair of arcuate shaped channels 29 and 30 are formed. A housing 31 is provided to surround this central core 28 and four ports C1, C2, P and R are connected through the housing 31 in the relationship illustrated in Fig. 3. A lever 32 controlled by an operating shaft 33 and button 34 is connected to the central core 28 so that said central core 28 can be rotated through ninety degrees by the movement of said shaft 33 from the position illustrated in full line to the position illustrated in dotted lines. The pressure port P is connected to the pipe 23 while the return port R is connected to a return line 35 that is in turn connected to the reservoir 17 of the hydraulic system. The port C1 is connected to a line 36 while the port C2 is connected to a line 37. The cylinders 38 and 39 are of a standard design in which a piston fitted within the cylinder is connected by means of a rod to a coupling joint and each of said cylinders has a fluid port 57, 59 and 58, 60 respectively, so that when fluid under pressure enters one end of said cylinder the piston will be moved away from that end towards the opposite end of the cylinder while the fluid on the opposite side of the piston will be forced out of the cylinder and in similar fashion fluid charged into the opposite end of the cylinder will force the piston in an opposite direction similarly forcing the fluid out of the cylinder from the opposite side of said cylinder. The lock cylinder 40 is also of a standard design in which a piston 40' is moved to either end of said cylinder depending upon into which end of the cylinder the fluid is forced, the cylinder 40 being provided with a pair of fluid ports 41' and 42' at its ends respectively. The cylinder 40 is also provided with a central rod 43 that may be reciprocated with the movement of the piston 40' in cylinder 40 and which extends beyond both ends of said cylinder. The valves 44 and 45 are similar in structure comprising a housing 46 having ports 50A, 51A and 50B, 51B, respectively with a slide valve 47 mounted in a central bore in the valve and normally urged to valve closing position by a spring 49. The slide valve 47 of valve 44 is provided with a longitudinally extending pin 48 extending through one end of said valve housing 46 and controlled by the end 45' of rod 43. The slide valve 47 in valve 44 is so formed that under the urging of spring 49, ports 50A and 51A will be closed. The slide valve 47 in valve 45 is so formed that in the position illustrated, fluid entering through port 50B may pass through the valve and out port 51B and vice versa. Valve 45 is controlled by an external finger 53 connected to the piston rod of cylinder 39 and movable against the end of valve pin 48' fixed to slide valve 47 of valve 45.

When the slide valve 47 of valve 44 is in the position illustrated, it prevents the flow of fluid from port 50A to port 51A or vice versa. The fluid pressure line 37 is connected to port 42' of the lock cylinder 40 and to port 50A of the valve 44. A fluid line 55 is connected from the port 41' of the lock cylinder 40 to the port 50B of the valve 45. A fluid line 56 is connected between the port 51A of the valve 44 and the ports 57 and 58 of the hydraulic cylinders 38 and 39, respectively. The various components of the system illustrated in Fig. 3 being identified, the operation of this system may be apparent as follows. Fluid under pressure from line 23 will pass through channel 30 of the rotary valve 27, through the line 37 and due to valve 44 being in a closed position, as shown, the fluid under pressure will pass to the port 42' of the lock cylinder 40 causing the rod 43 to be retracted and the end 43' thereof which acts as a locking bolt withdrawn from locking engagement with a complementary locking conformation 44' in the structure in which it is normally positioned, which may be, for example, in the top 42 of the vehicle. As rod 43 is retracted, the opposite end 45' thereof will actuate pin 48 to move the slide valve 47 against the tension of spring 49 to provide communication between ports 50A and 51A for passage of fluid under pressure. The fluid will pass through the line 56 entering the ports 57 and 58 of the hydraulic cylinders 38 and 39 to move the piston rods therein to the position illustrated in broken lines. During the stroke of the pistons in said cylinders the fluid therein on the opposite side of the pistons will be forced out of the ports 59 and 60 through the line 36 and due to the slide valve 47 of valve 45 moving to valve closing position, closing ports 50B and 51B as the piston rod of cylinder 39 is moved, thereby moving finger 53 away from pin 48', the fluid will flow past valve 45 through line 36, port C1 and channel 29 of valve 27, through port R and line 35 to reservoir 17.

Thus with the valve 27 in the position illustrated, an automobile hood 41 or a top 42 controlled by cylinders 38 and 39 and by lock cylinder 40 may be unlocked and raised.

Similarly by moving the button 34 to the position illustrated in broken lines, the hub 28 of valve 27 will be rotated 90 degrees so that channel 29 will connect ports P and C1 and channel 30 will connect ports C2 and R. In this position, fluid under pressure will flow from line 23 through port P, channel 29, port C1, line 36 and with valve 45 in closed position as it is with the hood 41 or top 42 raised, the fluid will flow to ports 59 and 60 of cylinders 38 and 39.

As a result, the fluid under pressure will move the piston in cylinders 38 and 39 in direction to retract the associated piston rods to lower the hood or top of the car. When the piston rod in cylinder 39 has been moved sufficiently so that finger 53 abuts against pin 48', the slide valve 47 of valve 45 will be moved to open the ports 50B and 51B. As a result, fluid under pressure from line 36 will pass through valve 45 and line 55 to port 41' of lock cylinder 40 moving the rod 43 thereof so that end 43' will be moved into locking engagement with locking conformation 44' in the hood 41 or top 42 as the case may be.

During the movement of the pistons in cylinders 38 and 39 to hood or top lowered position, the fluid forced out of ports 57 and 58 of these cylinders will flow through lines 56, open ports 51A, 50A of valve 44, line 37, port C2, channel 30, port R, line 35 to reservoir 17. It is also to be noted that when the hood or top is fully closed and locked, end 45' of rod 43 will have moved upwardly to the position indicated in Fig. 3 so as to release pressure on pin 48, thus permitting spring 49 to elevate slide valve 47 of valve 44 to close ports 50A and 51A so that the system is ready for the next operation.

Although the system shown in Fig. 3 has been described with relation to a hood 41 or a folding top 42, it may be used with any component where it is necessary to unlock such component and move it in two directions and then relock.

In Fig. 4 is diagrammatically shown the mount for a cylinder 39 which may be pivotally mounted in its base to a bracket 63 by means of a pin 62, the bracket being affixed to the frame of the vehicle. The piston rod in cylinder 39 is connected by a coupling 64 to folding levers F for the folding top 42 or may be connected as at X to one end of the hood 41 of the vehicle.

Referring to Fig. 5, there is illustrated actuating mechanism for a trunk cover 77 in which a rotary valve 70 is provided similar to valve 27, except that it has but one arcuate channel 71.

The valve 70 may be positioned in either of two positions as illustrated. In one position, arcuate channel 71 connects pressure port P with port C2 while in the other position, channel 71 connects port C2 with return port R. As shown, port C2 is connected by line 72 to port 74 of hydraulic cylinder 73, the latter having but this single port. The piston in cylinder 73 is normally urged downwardly by a spring 75 therein and the piston is moved upwardly when fluid under pressure is forced into port 74.

With valve 70 in the position shown, fluid entering port P will pass through channel 71, port C2, line 72 into port 74 to lift the piston and piston rod in cylinder 73 against the tension of spring 75. As a result, the trunk cover 77 will be opened. To close the cover 77 it is merely necessary to actuate valve 70 so that channel 71 provides communication between ports C2 and R and seals port P. As a result, the tension of spring 75 will move the piston and piston rod in cylinder 73 downwardly to lower the trunk cover 77 and the fluid in cylinder 73 will be forced out of port 74, line 72, port C2, channel 71, port R and line 35 to reservoir 17.

The system shown in Fig. 5 may also be used to open and shut a window 81. Referring to Fig. 1, a single port cylinder 80 is provided, similar to cylinder 73, and a spring retaining mechanism 82 is provided to close the window 81. Thus, by actuating a valve 70A, similar to valve 70, fluid under pressure may be forced into the cylinder 80 to open the window and the latter may be retained open by cutting off the pressure. By moving the valve 70A to closed position as shown in Fig. 5, the spring mechanism 82 will close the window and expel fluid from cylinder 80.

A system similar to that shown in Fig. 5 and that operating the windows may be used to move the seat 91 of a vehicle to any desired position. The seat is actuated by a hydraulic cylinder 90 and a return spring mechanism 92 and controlled by a valve 70B similar to valve 70.

Since the average automobile when running is continually driving the generator 12 and pump 15, there is a surplus of energy wasted and in this particular installation the pump 75 may be very small as fluid is continuously pumped through the unloaded valve 20 to accumulator 25. Thus a large accumulator 25 may be provided to store an ample amount of fluid under pressure to permit the actuation of any and all hydraulic components connected to the hydraulic system a plurality of times even when the automobile engine is not running.

Although various hydraulic components have been illustrated as connected to the hydraulic system as described, various changes in the components or modifications in the use of these components may be made without departing from the spirit of this invention and this invention should be limited only by the appended claims.

What is claimed is:

1. A device for actuating a pivotally mounted member of the type having a locking conformation, comprising a hydraulic cylinder having a piston therein, a piston rod actuated by said piston and operatively connected to said pivotally mounted member, a second hydraulic cylinder having a piston therein and a piston rod actuated thereby and protruding beyond one end of said second hydraulic cylinder, said protruding end defining a locking bolt coacting with such locking conformation said pivotally mounted member to lock the same, a source of fluid under pressure, means to connect said source of fluid to said second hydraulic cylinder to move the bolt end of the piston rod thereof out of locking engagement with said pivotally mounted member, valve means actuated by said second piston rod to connect the source of fluid under pressure to said first hydraulic cylinder to actuate the piston rod therein in one direction, after said pivotally mounted member has been unlocked, thereby to pivot such member, means to connect said source of fluid to said first hydraulic cylinder to move the piston rod therein in the opposite direction and means after said piston rod has moved a predetermined amount in such opposite direction to connect such source of fluid to said second hydraulic cylinder to move the bolt end of the piston rod thereof into locking engagement with said pivotally mounted member.

2. The combination set forth in claim 1 in which a line connects said source of fluid to said second hydraulic cylinder and said last named means comprises a valve in said line having a slide member normally positioned in said valve in closed position with respect to said source of fluid when said piston rod of said first hydraulic cylinder has been actuated a predetermined distance in said one direction, said piston rod having a control arm actuating said slide member to open the valve with respect to said source of fluid when said piston rod has been moved a predetermined amount in such opposite direction.

3. The combination set forth in claim 1 in which the piston rod of said second hydraulic cylinder is operatively connected to said associated valve means to actuate the latter, said valve member being in closed position with respect to said source of fluid when said bolt end is in locking position and in open position with respect to said source of fluid when said bolt end has been retracted from the complementary locking conformation on said pivoted member.

EDWARD M. GREER.

REFERENCES CITED

The following references are of record in the file of this patent:

UNITED STATES PATENTS

| Number | Name | Date |
|---|---|---|
| 1,938,502 | Steindler et al. | Dec. 5, 1933 |
| 2,090,768 | Thomas | Aug. 24, 1937 |
| 2,130,618 | Gnavi | Sept. 20, 1938 |
| 2,210,519 | Wollensak | Aug. 6, 1940 |
| 2,216,518 | Parsons | Oct. 1, 1940 |
| 2,248,379 | Parsons | July 8, 1941 |
| 2,264,375 | Hill et al. | Dec. 2, 1941 |
| 2,283,761 | Richter | May 19, 1942 |
| 2,306,348 | Spear | Dec. 22, 1942 |
| 2,322,839 | Falcon | June 29, 1943 |
| 2,350,634 | Parsons | June 6, 1944 |
| 2,352,929 | Worgess | July 4, 1944 |
| 2,432,895 | Horton | Dec. 16, 1947 |
| 2,437,520 | Gunning | Mar. 9, 1948 |

FOREIGN PATENTS

| Number | Country | Date |
|---|---|---|
| 531,465 | Great Britain | Jan. 6, 1941 |